Sept. 4, 1973　　　　　　G. M. MICHEL　　　　　　3,756,900
APPARATUS FOR ULTRASONICALLY WELDING THE ENDS OF TUBES
IN SYNTHETIC PLASTIC MATERIALS
Filed March 8, 1972　　　　　　　　　　　　　2 Sheets-Sheet 1

United States Patent Office 3,756,900
Patented Sept. 4, 1973

3,756,900
APPARATUS FOR ULTRASONICALLY WELDING THE ENDS OF TUBES IN SYNTHETIC PLASTIC MATERIALS
Georges Maurice Michel, Paris, France, assignor to Geneco Inc., Panama, Geneva, Switzerland
Filed Mar. 8, 1972, Ser. No. 232,801
Claims priority, application Switzerland, Mar. 9, 1971, 3,464/71; Aug. 25, 1971, 12,480/71
Int. Cl. B32b 31/16; B65b 1/00; B23k 1/06
U.S. Cl. 156—580                      2 Claims

ABSTRACT OF THE DISCLOSURE

The ends of plastic material tubes, for example containing a living biological product, are ultrasonically welded by a cooperating tool and block which press the ends of the tubes into a V-section inscribed within the initial outer circumference of the tubes. The tubes are supported in grooves defined by elastic ribs on a conveyor belt, these ribs serving to prevent propagation of the ultrasonic vibrations along the tubes.

The present invention concerns the ultrasonic welding of the ends of tubes in synthetic plastics materials.

In several fields, notably in veterinary artifiical insemination, use is made of tubes in synthetic plastics material containing a living biological product, for example an animal seminal fluid. Once these tubes are filled, the open end is obtured by a stopper of polyvinyl alcohol. These tubes, called "straws," are adapted to be frozen and unfrozen and must be able to support considerable internal stresses and surface tensions whilst remaining fluidtight.

Obturation by means of a stopper of polyvinyl alcohol involves several drawbacks due to the fact that polyvinyl alcohol is initially in powder form: notably delicate handling and cleaning operations which are sources of pollution. To avoid these drawbacks, welding by heat or by high frequency radiation, and even closure by means of balls, have been proposed. But all of these means increase the outer dimensions of the tubes, modify their bulk and do not form barriers against pollution.

The treatment of rigid thermoplastics tubes ultrasonically should enable welding to be carried out whilst eliminating any risk of contamination or pollution. Ultrasonic welding is analogous to friction welding the contacting surfaces of the pieces to be assembled. To carry this out, a tool vibrating at an ultrasonic frequency is applied perpendicularly to the surface of one of the pieces to be welded.

The transfer of vibratory energy takes place by contact of the vibrating tool on the plastics material. The element which is the seat of transfer of energy enters into vibration according to a train of stationary transversal waves with a maximum amplitude on the contacting surfaces of the pieces to be assembled. Under the effect of the ultrasonic vibrations, the piece submitted to the vibrating tool thus adopts a localised movement relative to the second piece which remains inert. The application of a given pressure conjugated with the ultrasonic vibrations produces a high frequency alternating rubbing movement of the surfaces of the pieces. The heat generated abruptly melts the plastics material of the two pieces which, after cooling, gives a homogeneous and solid weld.

Moreover the parts affected by the vibration are perfectly sterilised, in particular the outer surfaces of the ends of the tubes which may be contaminated by overflowing of the product that they contain. This is particularly important to avoid contamination from one tube to another.

However, it is necessary to avoid that the sterilization by the destruction of cells occurs beyond the welding zone in regions of the tube where the living product must be fully conserved.

It is also necessary, when welding tubes for the conservation of biological products and with a view to later handling, that the obturation does not modify the overall outer diameter of the tube. In other words, the terminal part of the tube must be perfectly inscribed within the initial circumference of the tube, and the tube must remain perfectly rectilinear.

An aim of the invention is to provide an apparatus enabling these requirements to be fulfilled.

The apparatus according to the invention comprises an ultrasonically vibrating tool and a block adapted to squeeze between them the ends of the tubes for welding, the tool having protuberances and the block having grooves facing the protuberances and of a complementary shape thereto, the profile of the protuberances and the grooves being such that the said ends of the tubes are given a substantially V-section which is inscribed in the initial outer circumference of the tubes when the tool comes to bear against the tubes for welding, and a guide supporting the tubes away from the block, said guide having grooves adapted to align with those of the block so that the tubes may be correctly aligned with the latter, and elastic pressure means for applying against the tubes on the guide at the moment of welding so that the guide absorbs the ultrasonic vibrations and prevents further propagation of the ultrasonic vibrations along the tubes.

The accompanying drawings show, by way of example, two embodiments of the apparatus according to the invention. In the drawings.

Figure 1:
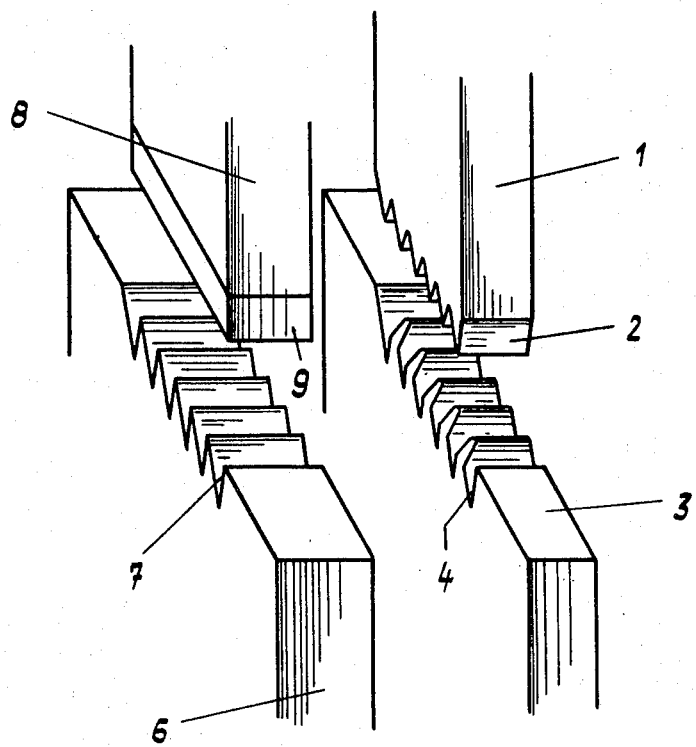
FIG. 1 is a schematic perspective view of a first embodiment.
Figure 2:
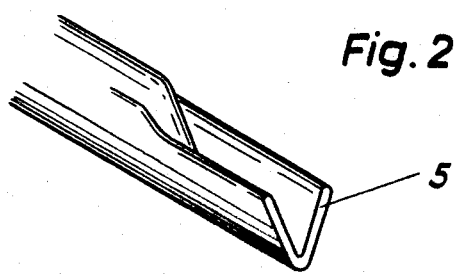
FIG. 2 is a perspective view of the welded end of a tube.

The apparatus shown in FIG. 1 comprises an ultrasonic vibrating tool 1 having protuberances 2. Below the tool 1 is disposed a fixed block 3 having grooves 4 facing the protuberances 2. The complementary profiles of the protuberances 2 and the grooves 4 enable the tubes pressed between the tool and the block to be given a substantially V-section (FIG. 2) which is entirely inscribed within the initial circumference of the tube.

A fixed guide 6 is arranged a short distance away from the block 3 and has grooves 7 disposed facing, and in alignment with, the groove 4 of the block. The tubes to be welded, not shown in FIG. 1, are disposed along the grooves 7 and 4, the ends of the tubes which are to be welded being placed in the grooves 4 flush with the outer surface of the block 3, the tubes extending to the left of the figure further than the guide 6. The guide 6 thus enables the tubes to be supported on the block 3 in a correct alignment and disposition for welding.

A pressure member 8 is disposed above the guide 6 and carries at its lower part an elastic cushion 9, for example in rubber.

The apparatus operates as follows. The tubes to be welded are arranged in the grooves 4 and 7. The tool 1 is lowered at the same time as the pressure member 8 in a manner such that when the tool 1 comes to squeeze the tubes in the grooves 4 of the block 3, the elastic cushion 9 presses the tubes in the grooves 7 of the guide 6. Hence, during the welding of the ends of the tubes, the guide 6 absorbs the ultrasonic vibration transmitted by the tubes from the tool 1 and prevents further propagation of the vibration along the tubes. Thus, living matter disposed in the tubes is sterilized at the welded end of the tubes, but remains alive in the parts of the tubes beyond the guide 6, which parts undergo no vibration.

An adjustable spring may ensure the desired pressure of the tool onto the tubes disposed on the block. A cam operated switch placed on a chassis of the apparatus may be used to adjust the time of production of ultrasonic vibrations whilst the tool is in the lower position.

Figure 3:
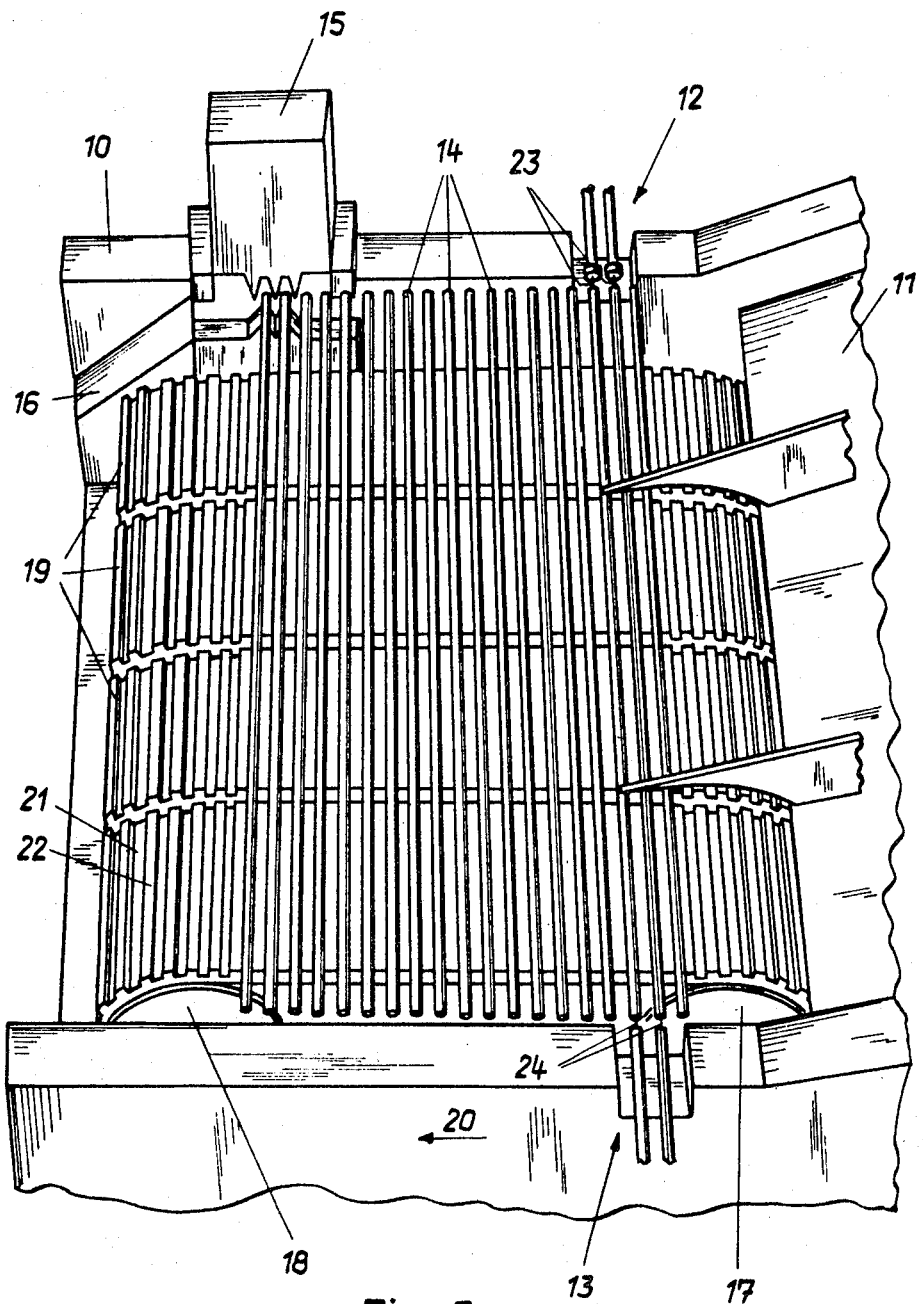
FIG. 3 is an overall perspective view of a second embodiment.

The apparatus shown in FIG. 3 comprises a frame 10 carrying an inclined feed tray 11, a filling station 12 and a cooperating suction station 13 adapted to operate together to fill up tubes 14. The frame 10 also carries a movable ultrasonically vibrating tool 15, a movable block 16, and cylinders 17 and 18 able to turn under the action of a motor, not shown. The cylinders 17 and 18 carry four belts 19 in elastic material, for example rubber, which are driven by the cylinders 17 and 18 in the direction of the arrow 20. The belts 19 are creneled, comprising transversal grooves 21 defined between ribs 22. The grooves of the four belts are exactly aligned by means of a driving drum, not shown, which is fluted and in one piece, each tooth of the drum simultaneously penetrating into one of the grooves of each of the four belts which are thus driven in synchronization.

The apparatus operates as follows: The drum is driven with an intermittent rotary movement, transmitting to the upper run of the belts a corresponding forward intermittent movement according to arrow 20. Where the belts curve about the cylinder 17, the ribs 22 defining the grooves 21 separate from one another because of the curvature by and amount slightly greater than the external diameter of the tubes 14. When the belts are in motion, the tubes 14 delivered one by one down the tray 11 thus successively penetrate in temporarily "opened" aligned grooves 21 of each of the four belts 19. The tubes 14 are then squeezed between adjacent ribs 22 of the grooves along the rectilinear part of the upper run of the belts 19 between the cylinders 17 and 18.

The movement of the belts is synchronized to stop when two tubes 14 come to face the stations 12 and 13. Needles 23 in the filling station 12 penetrate into one of the ends of the two tubes 14 while needles 24 of the suction station 13 penetrate into the other ends of the same tubes. Valves then open in each of the stations 12 and 13, respectively connecting the needles 23 to a source of liquid with which the tubes are to be filled, and the needles 24 to a vacuum source producing a suction in the tubes. The two tubes are thus filled with the liquid and the needles 23 and 24 are withdrawn.

When the belts are stopped with two tubes facing the stations 12 and 13, two other already-filled tubes are disposed facing the tool 15. The tool 15 moves down and the block simultaneously moves up to pinch the tubes and form welds at the corresponding ends of the tubes. The ribs 22 of the belts form an elastic pressure member which presses the tube so as to absorb or damp the ultrasonic vibrations and prevent the vibration from propagating along the tubes. The welded tubes are then driven by the belts 19 and, when the tubes pass over the cylinder 18, the ribs 22 separate sufficiently to allow the filed tubes to fall into a recipient, not shown.

The intermittent motion of the belts 19 is such that the stopping time of the tubes in front of the stations 12 and 13 and below the tool 15 may be $57/100$ of a second, and the forward movement of the belts between the stops takes place during $43/100$ of a second.

It should be noted that for the sake of clarity of the drawings, the tubes 14 have only been shown between the stations 12 and 13 and the tool 15. Moreover, a second welding device identical to that shown, could be provided to simultaneously obture the other ends of the tubes.

What is claimed is:

1. An apparatus for ultrasonically welding the ends of tubes in synthetic plastics material, comprising an ultrasonically vibrating tool and a block adapted to squeeze between them the ends of the tubes for welding, the tool having protuberances and the block having grooves facing the protuberances and of a complementary shape thereto, the profile of the protuberances and the grooves being such that the said ends of the tubes are given a substantially V-section which is inscribed in the initial outer circumference of the tubes when the tool comes to bear against the tubes for welding, and a guide supporting the tubes away from the block, said guide having grooves adapted to align with those of the block so that the tubes may be correctly aligned with the block, and elastic pressure means for applying against the tubes on the guide at the moment of welding so that the guide absorbs the ultrasonic vibrations and prevents further propagation of the ultrasonic vibrations along the tubes.

2. An apparatus according to claim 1, in which the guide is formed by at least one conveyor belt in elastic material comprising transversal grooves adapted to receive the tubes, said transversal grooves being defined between elastic ribs which form said elastic pressure means.

References Cited
UNITED STATES PATENTS

| | | | |
|---|---|---|---|
| 2,715,087 | 8/1955 | Barradas | 156—580 |
| 3,386,870 | 6/1968 | Morin | 156—580 |

DOUGLAS J. DRUMMOND, Primary Examiner

U.S. Cl. X.R.

53—266, 373; 228—1